Patented Aug. 17, 1954

2,686,816

UNITED STATES PATENT OFFICE 2,686,816

ARYL TRICHLORETHANOLS

Willy Stoll, Basel, and Charles J. Morel, Arlesheim, Basel-Land, Switzerland, assignors to J. R. Geigy A. G., Basel, Switzerland, a Swiss firm No Drawing. Application November 30, 1950, Serial No. 198,494

Claims priority, application Switzerland December 16, 1949

6 Claims. (Cl. 260—618)

This invention concerns the production of new aryl trichlorethanols.

According to the present invention, new α-aryl-β,β,β-trichlorethanols are provided of the general formula:

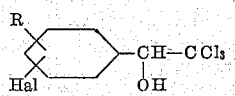

wherein R represents a lower alkyl radical with 1-4 carbon atoms, and Hal represents chlorine or bromine.

It has now been found that these compounds possess an excellent anthelmintic action. At the same time, their toxicity to warm blooded animals is relatively low, so that they can be used to combat parasitic worms in man and animals. The compounds can also be used in plant protection, for example as acaricides.

The new compounds can be prepared by introducing by methods known per se an α-hydroxyl-β,β,β-trichlorethyl radical into a benzene derivative which contains the substituents R and Hal.

With the help of a Friedel-Crafts condensation agent such as AlCl₃, FeCl₃, SnCl₄, BF₃, TiCl₄, chloral can be condensed with a compound of the general formula:

In this and all further formulae, R and Hal have the meanings given above. The reaction can take place either in an excess of the starting product or in an inert solvent such as carbon disulphide or carbon tetrachloride.

The new compounds can also be produced by the addition of chloroform to aldehydes of the general formula:

by means of alkali hydroxide.

A third process consists in the reduction of di-substituted trichloracetophenones of the general formula:

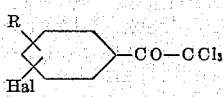

e. g. by means of aluminium isopropylate according to Meerwein-Ponndorf.

The above mentioned di-substituted trichloracetophenones are obtainable for example from alkyl halogen benzenes and trichlor-acetic acid chloride according to Friedel-Crafts.

Dihalogen compounds of the general formula:

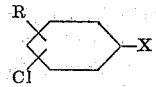

wherein X represents bromine or iodine, can be converted into the corresponding organic magnesium halides by means of magnesium according to Grignard and then reacted with chloral.

Ortho - chlorotoluene, o - bromotoluene, o-fluorotoluene, m-chlorotoluene, m-bromotoluene, p-chlorotoluene, p-bromotoluene, p-fluorotoluene, o-chlorethyl-benzene, o-bromethyl-benzene, p-chlorethyl-benzene, p-bromethyl-benzene, o-chlorocumene, o-bromocumene, p-chlorocumene, p-bromocumene, o-bromopropyl-benzene, p-chloropropyl-benzene, p-bromobutyl-benzene, p-chlorisobutyl-benzene, o-chlorotertiary butyl-benzene, p-bromotertiary butyl-benzene, p-bromo-secondary butyl-benzene are starting products of the following general formula:

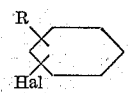

for the first general process.

Generally the trichlorhydroxy ethyl radical takes the p-position, in some cases also the o-position, to the halogen atom in the benzene nucleus in the Friedel-Crafts condensation process.

The second, third and fourth processes mentioned above also enable many variations to be made in the position of the substituents in the end products.

The characterisation of the compounds and their purification is most advantageously attained through their acyl compounds, i. e. the easily produced acetates, from which they may be regained in a pure form by saponification, e. g. with dilute sulphuric acid.

The following examples serve to further illustrate the invention.

*Example 1*

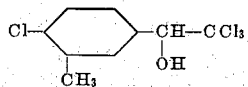

127 grams of o-chlorotoluene, 147 grams of chloral and 1200 grams of carbon disulphide (this can also be replaced by the same amount of carbon tetrachloride or by a further 500 grams of o-chlorotoluene) are mixed together and, while stirring, are cooled to 0–5° C. 45 grams of aluminium chloride are then added in small portions in such a manner that the temperature does not rise above 5° C. The mixture is then stirred for 48 hours at a temperature of 0–5° C. Ice water is then added, the mixture is well stirred and then distilled with steam, whereby carbon tetrachloride and any o-chlorotoluene not consumed by the reaction pass over. The residue is extracted with ether, the ethereal solution is washed with water and dried over sodium sulphate. After filtration and distillation of the ether, the residue is distilled under a high vacuum.

The raw carbinol so obtained is then treated with the same amount by weight of acetic acid anhydride and 1 drop of concentrated sulphuric acid, and heated for 1 hour under reflux. While it is still warm and while stirring briskly, the mixture is poured into ice water. Immediately, or after standing a short time, the oil which separates solidifies to a paste containing crystals. This is drawn off, washed with water till it is neutral and dried over calcium chloride in the desiccator. The acetate, when recrystallised from alcohol, melts at 93–94° C.

To saponify, 280 grams of the acetate are dissolved hot in 1200 grams of ethyl alcohol, 500 grams of 30% sulphuric acid are added and the mixture is boiled for 24 hours under reflux. After cooling, it is poured in water, extracted with ether and the ethereal solution is washed with sodium bicarbonate and water and dried over sodium sulphate. After filtering and distilling off the ether, it is fractionated under a high vacuum. $\alpha$-(3 - methyl - 4 - chlorophenyl)-$\beta,\beta,\beta$-trichlorethanol is a highly viscous colourless oil which boils at 118–119° C. under 0.1 mm. pressure.

If the o-chlorotoluene is replaced by a similar amount of m-chlorotoluene and the same procedure is followed, a mixture of $\alpha$-(2-chloro-4-methylphenyl)-$\beta,\beta,\beta$-trichlorethanol and $\alpha$-(2-methyl-4-chlorophenyl)-$\beta,\beta,\beta$-trichloroethanol is obtained in the form of a highly viscous oil which boils at 117–118° C. at 0.05 mm. pressure.

If instead of the o-chlorotoluene a similar amount of p-chlorotoluene is used, $\alpha$-(2-chloro-5 - methylphenyl) - $\beta,\beta,\beta$ - trichlorethanol is obtained in the form of a highly viscous colourless oil which boils at 115° C. under 0.2 mm. pressure. The acetate melts at 79–80° C.

*Example 2*

171 grams of o-bromotoluene, 147 grams of chloral and 3000 grams of carbon tetrachloride are placed in a flask provided with a stirrer, cooled to 0–5° C. and 44 grams of aluminium chloride are added in small portions at this temperature. The temperature is held at 0–5° C. for 48 hours while stirring. The mixture is then treated with ice water and distilled with steam. The residue is extracted with ether, washed with water, and dried over sodium sulphate. After distilling off the ether, it is distilled in a high vacuum.

The raw carbinol is then heated for a short time under reflux with the same amount by weight of acetic acid anhydride and a drop of conc. sulphuric acid. After the mixture has been poured into ice water and the oil which separates off has solidified, the paste is drawn off, washed with water and dried. Recrystallised from alcohol, the acetate melts at 68° C.

94 grams of the acetate are saponified by boiling for 24 hours with 400 grams of ethyl alcohol and 150 grams of 30% sulphuric acid. It is then poured into water and extracted with ether. The ether solution is washed with bicarbonate and water, dried over sodium sulphate, filtered off, the ether is distilled off and the residue is distilled in a high vacuum. $\alpha$-(3-methyl-4-bromo)-phenyl-$\beta,\beta,\beta$-trichlorethanol boils at 132–133° C. under 0.3 mm. pressure. It is a highly viscous colourless oil.

If instead of the o-bromotoluene, the same amount of m-bromotoluene is used, a mixture of $\alpha$-(2 - bromo - 4 - methylphenyl) -$\beta,\beta,\beta$-trichlorethanol and $\alpha$-(2-methyl-4-bromophenyl) -$\beta,\beta,\beta$-trichlorethanol is obtained which boils at 126–127° C. under 0.18 mm. pressure.

*Example 3*

The Grignard compound is prepared from 103 grams of 2-chloro-4-bromotoluene in 400 grams of abs. ether with 12.5 grams of magnesium. 74 grams of chloral mixed with 200 grams of abs. ether are then added slowly dropwise, after which the mixture is boiled for 2 hours under reflux. It is then treated with ice water, to which some HCl has been added and the ethereal solution is separated off. This is then washed, first with ice cold dilute caustic soda lye and then with water and then dried over sodium sulphate. After filtration and distillation of the ether, it is fractionally distilled under a high vacuum. $\alpha$-(3-chloro-4-methyl) - phenyl-$\beta,\beta,\beta$-trichloroethanol is a highly viscous colourless oil which boils at 109–110° C. under 0.1 mm. pressure. The acetate of this carbinol melts at 65° C.

In the above example, if instead of 2-chloro-4-bromotoluene the same amount of 3-chloro-4-bromotoluene is used, by working in the same way, $\alpha$-(2-chloro-4-methylphenyl)-$\beta,\beta,\beta$-trichlorethanol is obtained which boils at 119–120° C. under 0.25 mm. pressure. The acetate melts at 68–69° C.

By using the same amount of 2-bromo-5-chlorotoluene, $\alpha$-(2 - methyl-4-chlorophenyl)-$\beta,\beta,\beta$-trichlorethanol is obtained which boils at 122–123° C. under 0.1 mm. pressure. The acetate melts at 104° C.

*Example 4*

151 grams of 3-chloro-4-methyl benzaldehyde are dissolved in 300 grams of abs. chloroform, cooled to 5–10° C. and 17 grams of very finely powdered potassium hydroxide are added over a period of 2 hours while stirring. The mixture is stirred for 20 hours at 25–30° C., and then poured into dilute ice cold sulphuric acid and extracted with ether. The ether extract, after being washed with water, dilute sodium bicarbonate solution and again with water, is evaporated, and the residue is fractionated. Some unchanged aldehyde is obtained as the first fraction. $\alpha$-(3 - chloro-4-methylphenyl)-$\beta,\beta,\beta$ - trichlorethanol passes over at 109–110° C. under 0.1 mm. pressure.

*Example 5*

14 grams of dehydrated AlCl$_3$ are added to 40 grams of o-chlorotoluene. 18.2 grams of trichloracetyl chloride are added dropwise at room temperature while stirring, and the mixture is stirred for sometime. The reaction mixture is then poured onto ice, the oily reaction product is separated off, washed with cold water, dried over CaCl₂ and distilled. The 3-methyl-4-chloro-ω-ω-ω-trichloracetophenone so obtained boils at 162–163° C. under 13 mm. pressure.

A solution of 27.2 grams of 3-methyl-4-chloro-ω-ω-ω-trichloracetophenone and 20 grams of aluminium isopropylate in 100 grams of abs. isopropanol are kept lightly boiling in a distillation column with a dephlegmator until tests of the distillate for acetone are negative. The greater part of the isopropanol is then distilled off. The residue is treated with 200 grams of ice water and 35 grams of conc. hydrochloric acid and extracted with ether. The ethereal solution is washed with water, dried with calcium chloride, the ether is distilled off and the oil which remains is distilled in the vacuum. The α-(3-methyl-4-chlorophenyl)-β.β.β-trichlorethanol so obtained boils at 118–119° C. under 0.1 mm. pressure.

What we claim is:

1. An α-aryl-β.β.β-trichlorethanol having the formula:

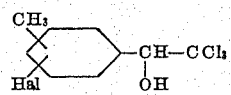

wherein Hal represents a member of the group consisting of chlorine and bromine.

2. An α-aryl-β.β.β-trichlorethanol having the formula:

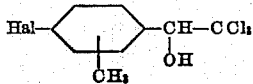

wherein Hal represents a member of the group consisting of chlorine and bromine.

3. An α-aryl-β.β.β-trichlorethanol having the formula:

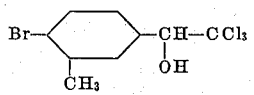

4. An α-aryl-β.β.β-trichlorethanol having the formula:

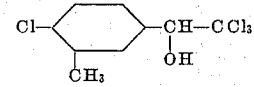

5. An α-aryl-β.β.β-trichlorethanol having the formula:

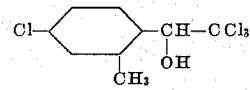

6. The mixture consisting of α-(2-chloro-4-methylphenyl)-β.β.β-trichlorethanol and α-(2-methyl-4-chlorophenyl)-β.β.β-trichlorethanol obtained from the reaction of m-chlorotoluene and chloral by means of a Friedel-Crafts catalyst.

References Cited in the file of this patent

Chattaway et al.: "Chem. Soc. Jour." (1934), pages 701–3.

Haller et al.: "Jour. Am. Chem. Soc.," vol. 67, page 1593 (1945).